US010342241B2

(12) United States Patent
Cowans et al.

(10) Patent No.: US 10,342,241 B2
(45) Date of Patent: Jul. 9, 2019

(54) TEMPERATURE CONTROL SYSTEM AND METHOD TDSF PLUS

(71) Applicant: B/E Aerospace, Inc., Wellington, FL (US)

(72) Inventors: Kenneth W. Cowans, Fullerton, CA (US); William W. Cowans, Fullerton, CA (US); Glenn Zubillaga, Canon Lake, CA (US)

(73) Assignee: B/E Aerospace, Inc., Winston Salem, NC (US)

( * ) Notice: Subject to any disclaimer, the term of this patent is extended or adjusted under 35 U.S.C. 154(b) by 361 days.

(21) Appl. No.: 15/164,820

(22) Filed: May 25, 2016

(65) Prior Publication Data
US 2016/0262419 A1 Sep. 15, 2016

Related U.S. Application Data

(62) Division of application No. 13/181,753, filed on Jul. 13, 2011, now Pat. No. 9,360,243.
(Continued)

(51) Int. Cl.
A23G 9/08 (2006.01)
A23G 9/22 (2006.01)
F25B 5/04 (2006.01)
F25B 40/00 (2006.01)
F25B 40/04 (2006.01)
(Continued)

(52) U.S. Cl.
CPC ............... A23G 9/086 (2013.01); A23G 9/22 (2013.01); F25B 5/04 (2013.01); F25B 40/00 (2013.01); F25B 40/04 (2013.01); F25B 41/003 (2013.01); F25B 49/02 (2013.01); F25B 41/04 (2013.01); F25B 41/043 (2013.01); F25B 41/06 (2013.01); F25B 2339/041 (2013.01); F25B 2341/0662 (2013.01); F25B 2400/01 (2013.01); F25B 2400/0403 (2013.01); F25B 2400/0405 (2013.01); F25B 2400/0411 (2013.01); F25B 2400/24 (2013.01); F25B 2600/0261 (2013.01); F25B 2600/2501 (2013.01); F25B 2600/2507 (2013.01); F25B 2600/2513 (2013.01); F25B 2600/2521 (2013.01); F25B 2700/1933 (2013.01); F25B 2700/21152 (2013.01); F25B 2700/21171 (2013.01)

(58) Field of Classification Search
CPC .......... F25B 40/00; F25B 40/04; F25B 41/03; F25B 41/003; A23G 9/086
See application file for complete search history.

(56) References Cited

U.S. PATENT DOCUMENTS 2,373,806 A * 4/1945 Barnes .................... A61J 1/165
211/1.53
2,412,068 A * 12/1946 Spader ................... A23G 9/227
126/338
(Continued)

Primary Examiner — Kun Kai Ma
(74) Attorney, Agent, or Firm — Donna P. Suchy

(57) ABSTRACT

A temperature control system is disclosed where thermal energy generated by pressurization of a gaseous medium is stored at a selected temperature level so that it is later readily accessible. Temperature control of a two-phase medium is exercised across selectable dynamic ranges and with different resolutions and the control can be exerted by varying the input flow rate of a mixture applied to a thermal load, or by controlling the back pressure of the flow through the thermal load.

6 Claims, 5 Drawing Sheets

Related U.S. Application Data

(60) Provisional application No. 61/364,216, filed on Jul. 14, 2010.

(51) Int. Cl.
   *F25B 41/00* (2006.01)
   *F25B 41/04* (2006.01)
   *F25B 41/06* (2006.01)
   *F25B 49/02* (2006.01)

(56) References Cited

U.S. PATENT DOCUMENTS

| | | | | |
|---|---|---|---|---|
| 2,648,203 | A * | 8/1953 | Heuser | F25C 1/06 241/101.1 |
| 2,909,640 | A * | 10/1959 | Fairbrother | B23H 1/00 219/69.15 |
| 2,959,033 | A * | 11/1960 | Raver | F25C 1/142 62/347 |
| 3,494,139 | A * | 2/1970 | Thompson | F25C 1/20 62/123 |
| 3,863,462 | A * | 2/1975 | Treuer | F25C 1/142 62/345 |
| 4,429,549 | A * | 2/1984 | Randolphi | A23G 9/20 366/149 |
| 4,538,509 | A * | 9/1985 | Ojima | A21B 1/40 366/144 |
| 5,157,939 | A * | 10/1992 | Lyon | F25C 1/142 62/345 |
| 5,363,660 | A * | 11/1994 | Li | A23G 9/12 62/71 |
| 5,363,746 | A * | 11/1994 | Gordon | A23G 9/12 366/145 |
| 7,334,425 | B1 * | 2/2008 | Johnson | F25D 11/02 62/440 |
| 2003/0013590 | A1 * | 1/2003 | Dolecek | A61M 1/3693 494/37 |
| 2010/0075013 | A1 * | 3/2010 | Takata | A23G 9/04 426/565 |
| 2016/0279679 | A1 * | 9/2016 | Kitagawa | B08B 3/10 |
| 2017/0219278 | A1 * | 8/2017 | Hui | F25D 29/00 |

\* cited by examiner

TEMPERATURE CONTROL SYSTEM AND METHOD TDSF PLUS

REFERENCES TO PRIOR APPLICATIONS

This is a divisional application based on U.S. Ser. No. 13/181,753, filed Jul. 13, 2011, which claims priority from U.S. Application No. 61/364,216, filed Jul. 14, 2010, which are incorporated herein by reference in their entirety.

BACKGROUND OF THE INVENTION

A number of issued U.S. patents of the present inventors, such as U.S. Pat. Nos. 7,178,353 B2, 7,415,835 and 7,765,820 disclose and claim different aspects of a unique methodology for control of the temperature of a thermal load. This methodology has generically been termed "Transfer Direct of Saturated Fluids" (usually abbreviated to TDSF) to identify in summary fashion that a two phase medium is not only temperature controlled but is itself in direct thermal contact with the thermal load. It also indicates that different states of the media are employed, varying from pure gas in an initial state through an intermediate range in which gas and liquid phases are mixed to provide a controllable temperature and pressure, and perhaps transitioning to pure liquid or gas phases under limiting conditions. The mixture of phases in the medium are varied in temperature and pressure so as to control the temperature of the load throughout a predetermined desired range without using an intermediate separate thermal transfer medium.

This technology was introduced initially to meet the precise temperature cycling and control requirements imposed in the semiconductor industry, where different process steps might require establishment of a succession of temperature levels at rapid speeds, often undertaking further exchanges of thermal energy as the process steps are effected. The use of the refrigerant itself in a direct thermal transfer with a load introduces specific problems in assuring control and stability, because of the phase changes that can take place as refrigerant temperature and pressure conditions are varied. Such problems are addressed and met in accordance with the method and apparatus patents referenced above.

The TDSF method and apparatus offer particular advantages for control of temperature within a chosen broad range, including flexibility in effecting the needed precision as to temperature, since the mixture of different phases of the refrigerant can be manipulated with versatility. The TDSF approach also facilitates the storage and manipulation of the internal energy in the different phases. When undertaking different modes of operation in these systems, multiple fluid paths exist in which single phase flows, and two-phase flows are separately established under controlled conditions. This enables thermal energy to be exchanged, stored and utilized in a variety of ways, and applicants disclose herein a multiplicity of ways providing novel systems and methods using such characteristics to advantage for effecting temperature control using thermal energy.

SUMMARY OF THE INVENTION

New functions and features for two-phase thermodynamic systems are realized, in accordance with the invention, by selectively retaining thermal energy and, separately or in conjunction therewith, incorporating different control loops which operate in co-acting or alternative fashion. The different control loops are configured to transfer, store, or manipulate thermal energy in various two-phase fluid states so as to provide different dynamic ranges, levels of resolution and operating temperature bands. In accordance with some features of the invention, a reservoir of the refrigerant fluid may be employed as a thermal capacitor in the control loop paths that transfer refrigerant fluid so as to receive and retain thermal energy for particular purposes in thermal energy cycling or transfer. The thermal capacitor provides convenient access to a large thermal mass for use in a number of processing modes employing mixed phases of the refrigerant medium.

A structure and operation based on modified TDSF principles incorporates a control loop arrangement which receives an output of hot gas from a compressor via the thermal capacitor and divides it into two paths, one of which is controlled in rate while the other flow, which is then differentially variable, dependent on the controlled flow, is first condensed and then expanded to a lower temperature level. These two flows, when combined, bring the thermal load to a chosen temperature, within the operating range. This control loop functions in accordance with the TDSF system and methods previously referenced, but with the incorporation of the thermal capacitor and other novel features, a number of new functions and capabilities are made feasible, enhancing system versatility while offering higher efficiency, usability and stability.

In accordance with the invention, for example, a second control loop is incorporated that co acts and cooperates with the basic TDSF system and also the thermal capacitor, to provide an additional temperature control mode of different range and precision. The second control loop is separately operable, switchable under command to receive output from the thermal load, and includes what may be called a back pressure control section. In accordance with this feature, the output path from the thermal load is so arranged that, under operation of the controller, it maintains the temperature of the thermal load by controlling the back pressure of the refrigerant which passes through the thermal load for ultimate return to the compressor input. Concurrently, the mix supplied to the thermal load input can be maintained in a predetermined state, so that varying the output flow from the thermal load in this manner provides a more efficient adjustment of load temperature than is readily achievable otherwise. Preferably, the return output flow from the thermal load is directed into a return proportional valve that is operated by the controller to maintain the thermal load temperature stable at a selected level by control of pressure in the two-phase medium at the load. The controller thus can manage the thermal load temperature by using either the first proportional valve or the return proportional valve exclusively. They can also be operated separately at appropriate temperature levels with a selected deadband between them, so there is no conflict in control. Alternatively, one can be at a fixed setting and the other separately controlled.

In accordance with another feature, a separate return path between the thermal load and the compressor input may be directed through an ambient temperature evaporator which operates the system so as to serve as a heat pump, providing a source of heat with low energy demand. To this end, output from the thermal load bypasses the thermal capacitor and is directed into a heat exchanger cooled by a suitable medium, such as air or water. In this ambient temperature evaporator circuit a sensing bulb which is positioned in the output path from the thermal load provides a control signal back to a second or return thermo-expansion valve (TXV) in the path of the output from the thermal load that is fed to the evaporator. This arrangement facilitates and enables efficient heating of the thermal load, using thermal energy available in the ambient temperature evaporator. The return flow to the compressor input can be directed through a close-on-rise valve which is incorporated to ensure, when necessary, that the input pressure to the compressor does not exceed a predetermined maximum. The return flow can also be directed through an open-on-rise-of input pressure (or temperature) or ORIT valve to ensure that the ambient temperature evaporator does not freeze the air or water used in the ambient temperature evaporator.

In operating in the typical TDSF mode, the return flow from the output of the thermal load (which usually bypasses the return thermo-expansion valve) is directed, for higher system efficiency, through one side of an "enhanced post conditioning" (EPC) heat exchanger in counterflow or parallel flow relation to the flow from the output of the first TXV. The output from the return side of the EPC heat exchanger is coupled back to the compressor input. This heat transfer step is useful in minimizing disparities in thermal transfer that occur as the ratio of liquid to vapor decreased in relation to position along the heat exchanger and as a result increases the effectiveness of heat transfer in cooling the thermal load.

Further in accordance with the invention, the thermal capacitor may also include an electric heater, so that when temperature in the thermal capacitor reservoir is sensed as being below target, the controller can provide a command signal to add heat as needed. The system may also include an auxiliary temperature control source in heat exchange relation with the thermal load but at a differential temperature from the thermal load. Command means are provided to direct air flow in heat exchange relation with an external heat exchanger at the thermal load and thereafter with the auxiliary temperature control source. This thermal transfer effects the needed adjustment of the cold source temperature, enabling a chosen higher temperature level to be accessible as a separate source of refrigeration for different chosen functions.

A practical and specific example of the use of these concepts is illustrated by application of its principles to the on-site preparation and delivery of individual servings of a comestible, such as Ice cream, to customers on a real time basis. In this configuration, the food preparation unit is constructed as a compact, stand-alone, device comprising a stationary support plate surmounted by a rotatable upper heat exchange surface or platen, on which the unfrozen ice cream ingredients are placed. A refrigeration system contained in a compact housing below the upper platen incorporates an underlying refrigeration system, which is rotated slowly, along with the platen, by a drive at the outer periphery of the housing. A chilled temperature controlled refrigerant is directed upwardly from within the compact housing, to refrigerate the platen by thermal conduction, and then recirculated back down into the unit below. The temperature controlled refrigerant rapidly cools and solidifies the ice cream ingredients on the platen, which ice cream can easily be removed and served.

The interior of the rotating compact housing incorporates, along with a thermal capacitor vessel, a small compressor unit above a horizontal condenser, and a cooling fan superposed on the condenser. Within the housing also are the TXVs, internal solenoid valves, sensors, and heat exchanger, the whole forming a highly efficient TDSF-type cooling system receiving electrical energy via a rotating slip ring coupled at the bottom of the housing.

Within the rotating housing under the platen, the thermal capacitor vessel is of adequate size for retaining thermal energy to be used in other modes and functions. The platen is first rapidly cooled by the refrigerant, and thereafter held at a level of, for example, approximately 12° F. or some other chosen level so different foods can be chilled and removed from its flat upper surface. The thermal energy stored in the thermal capacitor vessel can then later be used periodically to heat the platen for service and maintenance purposes. Electrical power is supplied via a slip ring at the housing base, to energize the compressor and fans as well as communicate any control signals that are needed. The rotational drive advantageously comprises a small motor and drive pulley mounted on an edge of the stationary support plate under an edge of the platen and extending downwardly to a pulley arrangement just under the plane of the belt, including a central driven pulley. Chilled refrigerant is flowed upwardly within this rotating interface to the underside of the platen, and then passed back to the compressor via refrigerant return paths within the housing. The operating temperature may be controlled in response to readings from an infrared sensor spaced apart from, but suitably close to the platen. This configuration is not only compact and reliable but energy efficient and easily maintained.

BRIEF DESCRIPTION OF THE DRAWINGS

A better understanding of the invention may be had by reference to the following description, taken in conjunction with the accompanying drawings. In which like numbers relate to like parts and in which.

DETAILED DESCRIPTION OF THE PREFERRED EMBODIMENTS

Figure 1:
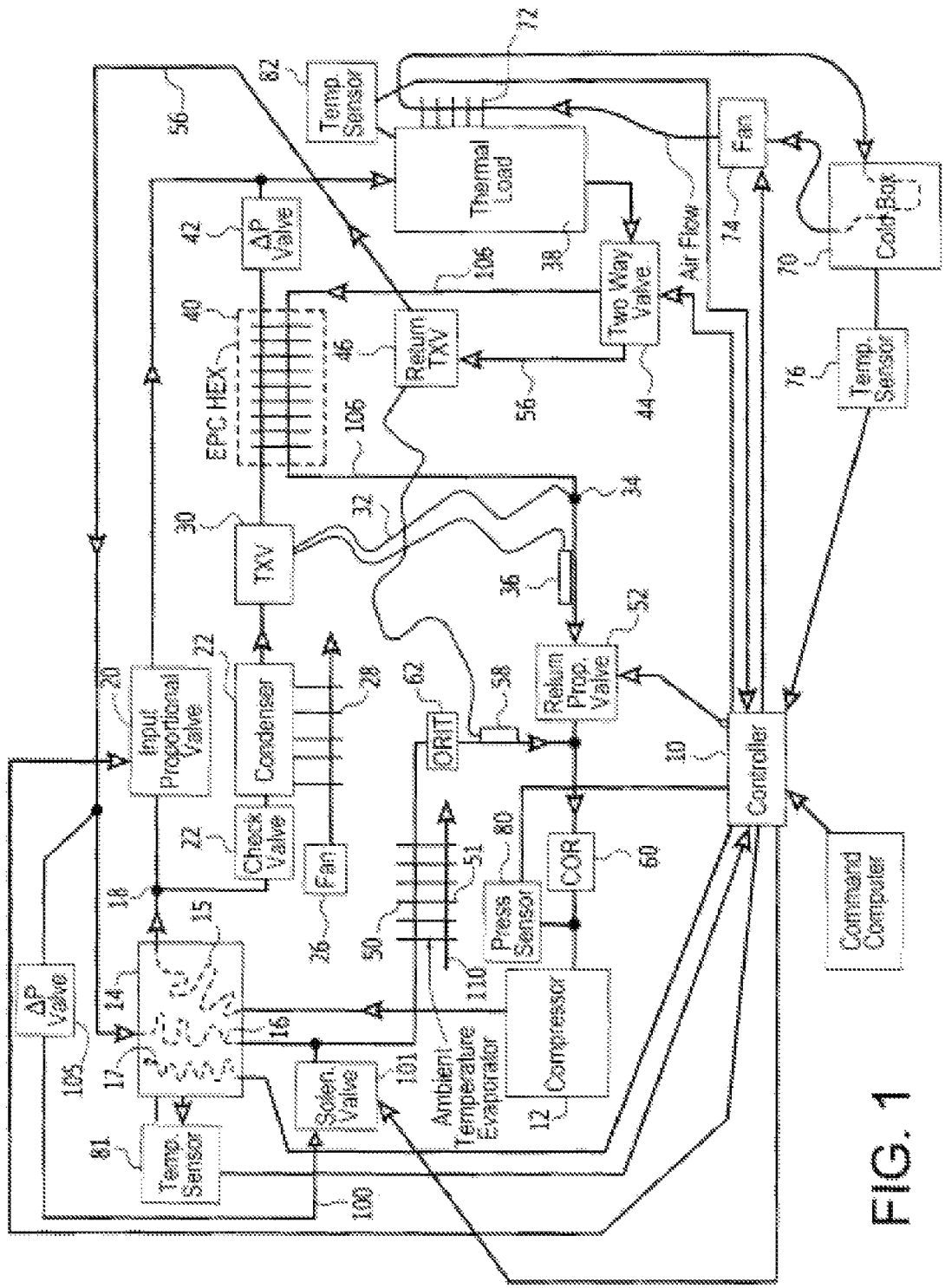
FIG. 1 is a block diagram of a temperature control system in accordance with the invention.

In a thermal control system in accordance with the invention, referring now to the block diagram of FIG. 1, a controller 10 for a system using a refrigerant having suitable transition properties (as to temperature and pressure) between gas and liquid phases operates a system using compressor 12. In the compressor 12 the refrigerant is pressurized to a hot gas at a useful temperature and pressure level, typically in the range of 80-100° C. and about 300 psi, in this example. The heated pressurized flow is directed through a thermal capacitor 14 which comprises a storage tank or vessel containing stabilized, chemically inert liquid, here about 2000 cc in volume. The liquid in the thermal capacitor 14 stores thermal energy from the gas flow for later extraction in different modes of operation, but the thermal mass remains liquid and does not enter a gaseous phase.

The present thermal control system and method employ additional novel variants and extensions of the TDSF concept to provide a multiplicity of operational features and functions that are depicted in the block diagram of FIG. 1. As described generally in the patents referenced above as to TDSF concept, the system shown may employ a refrigerant having selected temperature/pressure transition zones between, respectively, a pressurized hot pure gas phase, a mixed gas-liquid phase at a range of temperatures and pressures, and a colder pure liquid phase. The presently disclosed system, however, incorporates a substantial number of functions and features which extend the performance and capabilities of the TDSF approach. To such ends the system controller 10, which may be a dedicated or general purpose processor, receives input signals from various pressure and temperature sensors, and also operates a number of valves and switches, as described hereafter. Some other interior control functions that are taught below are performed independently of the controller 10, in accordance with the dynamic needs of the present system.

The origin of a principal flow loop begins with the infusion of energy, usually from an electrical source, into the flow output of the compressor 12, and this, as in the TDSF approach, feeds the selected refrigerant as a hot gas flow into one branch to be modulated in flow rate, while the differential in flow goes into a separate branch, to be condensed and thereafter expanded and cooled. These two flows are thereafter mixed to provide direct and precise temperature control of the thermal load. In accordance with the present invention, however, the output from the compressor 12 is directed first into a thermal capacitor 14 vessel via a first heat exchange channel 15. The vessel 14 also includes a second heat exchange channel 16 which is employed for counterflowing refrigerant in other operating modes, as described hereafter. The thermal capacitor 14 vessel contains a temperature stable fluid such as polyethylene glycol mixed with a proportion of water, as one example, which remains liquid under all relevant conditions of operation. The heated refrigerant flows through channels 15, shown diagrammatically only, which pass the refrigerant through the liquid in the vessel and efficiently exchange thermal energy with it. An electric heater element 17 which is also interior to the capacitor 14 can be activated by the controller 10 when certain conditions exist as to the temperature of the liquid or the mode of system operation, as described hereafter.

In this TDSF system version, hot gas output flowing from the first channel 15 of the thermal capacitor 14 is divided at a branch point 18, and a first flow therefrom is directly controlled by a proportional valve 20 which is operated by the controller 10. With this primary control of the flow rate, the second concurrent flow of hot gas, from the branch point 18, which can be termed a derivative (or differential) flow, traverses a check valve 22, which prevents back flow. This second flow is then liquefied in a condenser 24, here cooled by air flow 26 directed against cooling fins 28, although a liquid coolant arrangement could alternatively be employed in accordance with conventional practice. After the condenser 24, the refrigerant is further cooled to a temperature level depending on its pressure by expansion in a first externally equalized thermal expansion valve (TXV) 30. External equalization of the TXV 30 is effected in a known manner, as described in the previously referenced patents, by coupling an external equalization line 32 from a Junction 34 in the return path from the thermal load 38. On a separate line a pressure signal is directed to the TXV 30 from a sensor bulb 36 responsive to the temperature level of the flow being returned to the compressor 12 input after thermal transfer. The pressure difference in line 32 and that in bulb 36 regulates flow through TXV 30 so as to maintain a desired temperature difference between the refrigerant gas at point 34 and that of the refrigerant boiling at the pressure at point 34.

In this system, higher thermal efficiency is attained by flowing the first TXV 30 output in close heat exchange with flow being returned from the thermal load 38 in what has been termed an "Enhanced Post Condensation" (EPC) heat exchanger 40, as described by the inventors in previously filed U.S. application Ser. No. 12/285,596 filed Oct. 9, 2008 and assigned to the assignee of the present invention. In this flow system also the temperature of the cooled outgoing flow from TXV 30, which is a two phase mix, is lowered in temperature by a differential pressure ($\Delta p$) valve 42 before application to the thermal load 38 so as to assure that there is a temperature differential between the two flows in EPX HEX 40, and thus that there is proper operation of the EPC heat exchanger 40.

In a principal operating mode of the TDSF-committed portion of the system, therefore, a controlled hot gas flow from the proportional valve 20 is mixed at a junction with an appropriately cooled derivative flow from the flow circuit comprising the TXV 30, one side of the EPC heat exchanger (HEX) and then the $\Delta p$ valve 42. The mixture of direct and derivatively controlled flows is thereafter applied to the thermal load 38, which by the normal heat exchange process transfers thermal energy to maintain the thermal load 38 at a temperature set by the controller 10. The heat exchange at the EPC HEX 40 improves efficiency while the $\Delta p$ valve 42 introduces the pressure and temperature drops that are needed for proper operation.

Geometry and Functions of the Multi-Flow Control System

The system thus far disclosed, except for the capabilities introduced by the presence of the thermal capacitor 14 and the improvement in efficiency derived from the Incorporation of EPC HEX 40, generally incorporates earlier TDSF disclosures of the applicants. In accordance with the present invention, however, additional benefits and functions are derived by using the two-phase properties of the refrigerant in novel ways. Cycling the compressed heated refrigerant gas directly through the thermal capacitor 14 to increase the temperature of the storage liquid takes relatively little effort or energy and only a relatively short time interval, but enables later use of the stored thermal energy for other modes and purposes. For example, the output path from the thermal load 38 includes a two-way valve 44, which is operated on command by the controller 10 to direct output flow from the thermal load 38 to a second or return TXV 46. The output from the return TXV 46 flows oppositely to the flow direction from the main TXV 30, discussed above. The flow from the return TXV 46 is first lowered in temperature level by expansion in the return TXV 46. All liquid in the output of the return TXV 46 is then boiled off by injecting heat energy into the stream at the interior channel 16 before the flow from the thermal capacitor 14 returns to the input of compressor 12. The control of said return stream varies in response to signals from the controller 10. Such control is responsive to the mode of system heating, whether transient or steady state and to temperatures at various points in the TDSF system. This is further explained in detail below in the present specification.

Alternative Mode of Load Temperature Control Using Refrigerant Back Pressure

The return path to the compressor 12 input may also comprise a return proportional valve 52 operated by the controller 10 in response to the various sensed temperatures and pressures so as to provide a selective return flow pressure to the compressor 12, which also affects the back pressure presented to the thermal load 38. By holding the input to the thermal load 38 stabilized in temperature, the concurrent control of back pressure of the dual phase fluid from the load 38 controls the temperature maintained in the thermal load 38. This arrangement, governed by the controller 10, provides a different and novel way of controlling the thermal load temperature. In fact, a higher degree of resolution in the control function can be achieved using the thermal inertia of the medium in the output from the thermal load 38. Thus the temperature of the thermal load 38 may be determined either by flow through the input proportional valve 20 to the thermal load 38, with the return proportional valve 52 in a fixed setting, or by varying back pressure to outflow from the thermal load 38, using the return proportional valve 52, with the setting of the input proportional valve 20 to the thermal load 38 fixed.

This dual control can be used to stabilize the temperature of the thermal load 38 at a given setting in different ways, providing the benefits of the TDSF system in a more efficient manner. The return proportional valve 52 can be the sole means of control if proportional valve 20 is operated to be responsive to signals from controller 10 in response to signals from temperature sensor 82 coupled to thermal load 38. The pressure of the two-phase refrigerant controlling the load 38 can then be raised to control the temperature of load 38 by partially closing the return proportional valve 52.

Temperature control signals and mode selection signals can thus be directed by controller 10 to either valve 52 or valve 20 responsive to an input signal from temperature sensor 82, or both can be concurrently controlled. When switching from the input valve 20 to the return valve 52 the setting of valve 20 can be constrained to remain either fixed or, preferably from an energy efficiency standpoint, valve 20 can be controlled to slowly close at some predetermined rate. Said predetermined rate will be slow enough such that controller to can maintain required temperature control of load 38 while actively controlling only valve 52.

If it is desired to heat the load much more rapidly than can be accomplished by closing valve 52 alone, the controller 10 switches control from valve 52 to valve 20. Opening said valve 20 allows hot-gas to flow directly from the compressor 12, and this hot output flow is provided directly to the thermal load 38 via the mixing tee 48.

The controller 10 can thus separately optimize the proportional valve operation within its own parametric boundaries, so the proportional control valve 20 can be dominant in one mode which operates over a substantial range of temperatures, while the return proportional valve 52 can be dominant in another mode of higher resolution and stability, but narrower temperature range. When temperature control can be effected by operation of the proportional valve 52, system efficiency is enhanced. This is because a rise in temperature is accompanied by a decrease in power supplied to compressor 12. In each mode the other proportional valve 20 or 52 is held stable at its prior setting or a separately programmed control setting chosen to be an optimum for a specific operation. Conflict between these two control servo systems can be avoided by the introduction of a small deadband between them. Thus the controller 10 can actuate the proportional valve 20 at a higher pressure than the range at which the return proportional valve 52 is operated, and control accordingly can be reversed for opposite changes in pressure level. Or the mode selection can be based simply on the accuracy of temperature control maintenance that is desired.

The power into a refrigeration compressor varies in accordance with the pressure of the input into the compressor. In prior TDSF systems temperature regulation is obtained by combining flow of regulated hot gas with the derivative output of the TXV. The input pressure to the compressor is thus determined by the regulated temperature of the two phase mixture. Alternatively, maintaining that same pressure at the load by means of closing valve 52 reduces the input pressure to the compressor and thus reduces the input power to said compressor. A dual or shared control could be employed: In steady state cooling the valve 52 would then be the sole control. If rapid heating were to be suddenly needed, control could be given back to the broadband TDSF mode. During transition to full TDSF control valve 52 could be opened at a rate experimentally determined to be optimum. During transition back to full control by valve 52 the hot gas proportional valve 20 could be closed at some rate, also determined experimentally. The discussion above ignored the irreversible pressure drops that are inevitable in any system.

The valve 52 can alternatively be the sole temperature regulator within some limits.

These limits include:

1. Situations in which there is a need for rapid heating. The TDSF mode includes the advantage that rapid heating is available, but this is not available if valve 52 control is used alone.

2. There is a limit to the lowest level of cooling power that valve 52 control, if used alone, can offer. This is the low input pressure that the compressor imposes for proper operation.

Heatup Mode

The output path from the thermal load 38 in standard heatup mode connects through the two-way valve 44, then to the return TXV 46 and then via a heatup path 56, from which the flow returns to the input through the second channel 16 in the thermal capacitor 14 and then ultimately through an ambient temperature evaporator 50 to the compressor 12 input. Alternatively, depending on the setting of a solenoid valve 101 by the controller 10, the flow in return line 56 can bypass the thermal capacitor 14 and go directly to the ambient temperature evaporator 50. The heatup path assures that any liquid condensed within thermal load 38 will be boiled off to gas before the refrigerant is returned to the compressor 12 for recompression. To ensure this, the return TXV 46 in series with the thermal capacitor 14 and ambient temperature evaporator 50 acts to maintain the refrigerant in expanded state, because it is regulated by a TXV bulb 58 in the line returning to the compressor 12 input. The return TXV 46 is generally of the externally equalized type with its equalization line (not shown) being connected near the bulb 58. Therefore the refrigerant passing through the line at the location of the bulb 58 is constrained to be pure superheated gas by action of the TXV 46. It is recognized that in the heatup mode, this pure superheated gas may be at too high a pressure for the input to the compressor 12 and accordingly a close-on-rise (COR) valve 60 is included in the pathway to the compressor 12 input. The COR valve 60 holds the input pressure to a level which is acceptable to the compressor 12, although it may not be needed in all systems. A COR valve is only required if the input to compressor 12 could achieve pressures over that which compressor 12 can safely handle.

Rapid Heatup Mode

In the thermal capacitor 14, basic heat is supplied through the channel 15 flowing directly from the compressor 12 output. In the event that heating of the thermal capacitor 14 by direct flow from the compressor 12 output takes too long, the controller 10 can actuate an electrical heater 17 in the thermal capacitor in response to the temperature at the thermal capacitor 14 as detected thereat by a temperature sensor 81.

Heat stored in the thermal capacitor 14 can thus be used to efficiently effect a rapid heatup of the thermal load 38. Heatup path 56 branches off and bypasses through the channel 16 in the thermal capacitor 14 when the setting of the solenoid valve 101 directs the flow around the capacitor 14, as described below with reference to the ambient temperature evaporator 50. This heat developed and stored in the thermal capacitor 14 is a byproduct of operating the TDSF system for a period of time, normally with the thermal load 38 at a low to moderate temperature. The temperature level thus reached when using thermal capacitor 14 is therefore derived from compressor energy already expended. The output gas delivered from the compressor 14 through channel 15 within thermal capacitor 14 heats up the thermal capacitor 14 to a temperature close to that of the high pressure gas emerging from compressor 12, which is typically at a temperature in excess of 80° C.

Steady Heating Mode

In some circumstances and applications a steady source of thermal energy may be needed to operate for a substantial length of time, to provide heating in a specified range. In such event, the ambient temperature evaporator 50 disposed in the heatup path 56 from the return TXV 46 can be used to enable this versatile TDSF system to perform as a conventional heat pump. This configuration supplies thermal energy to the heatup path 56 for as long as needed. Heat so derived is obtained from cooling of the air (or water) medium 110 flowing by the fins 51 in the heat exchanger structure forming the major part of the evaporator 50. The ambient temperature evaporator 50 receives refrigerant flow from the output of a solenoid valve 101 when the valve is opened by the controller 10 and air 110 (or water) flowing on its fins 51, so heat transfer from the air (or water) flowing through the evaporator 50 supplies ambient level thermal energy to the refrigerant. This provides an output that replaces the flow from the return line 106 to the EPC HEX 40 when the two-way valve 44 is set to direct flow from thermal load 38 to the heatup path 56 via the return TXV 46 instead of the cooling return path 106 via the EPC hex 40.

Figure 2:
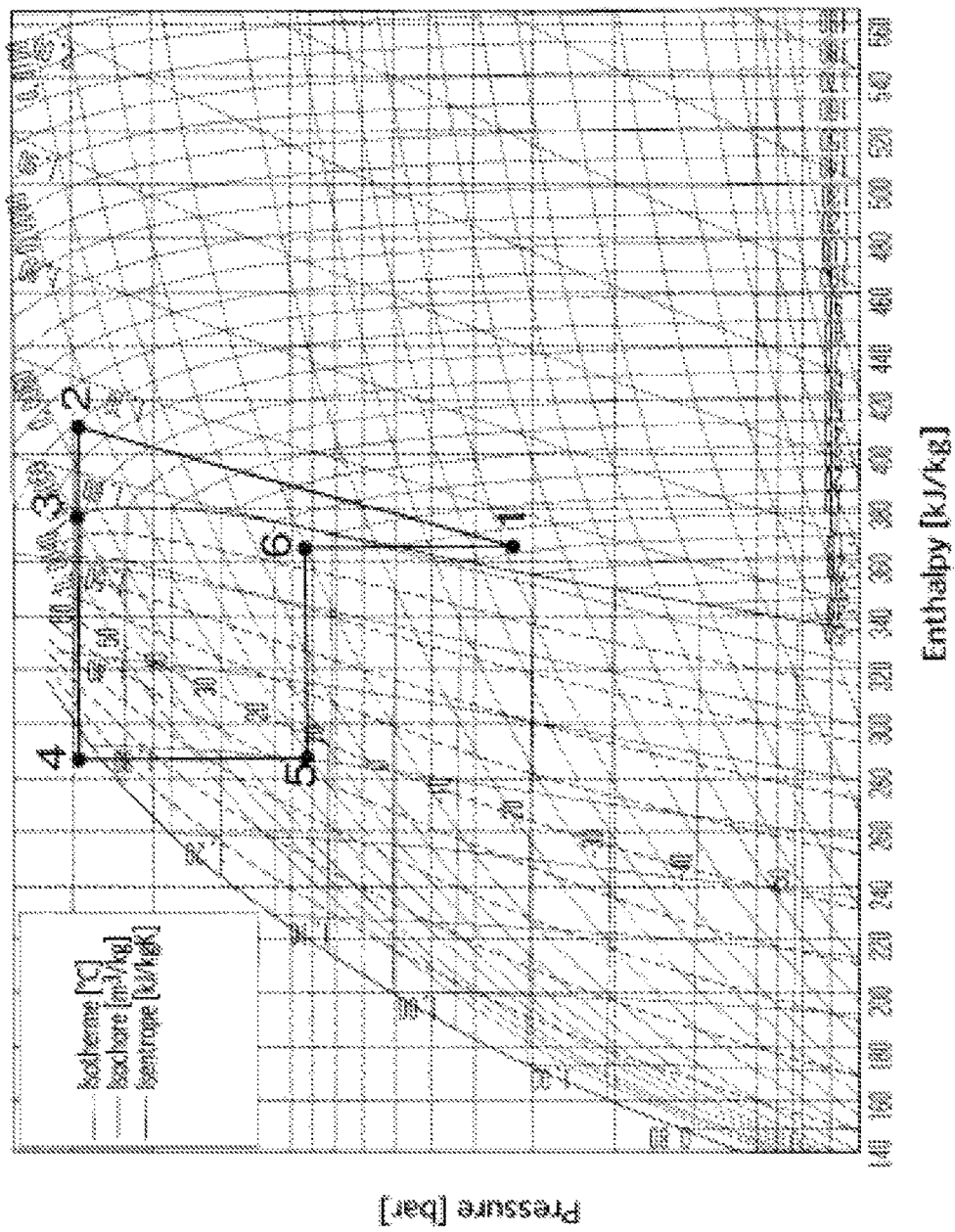
FIG. 2 is a Mollier diagram of the enthalpy versus pressure excursions during steady operating mode of a heat pump system in accordance with the invention as included in the system of FIG. 1.

The evaporator 50 operates in a heat pump cycle, which cycle is depicted in FIG. 2 by a typical Mollier diagram using refrigerant R404A as an example. In FIG. 2, the output from compressor 12, which receives input refrigerant uncompressed at point 1, is compressed to higher pressure and enthalpy at point 2. The high pressure gaseous refrigerant is then cooled in the system to a lower enthalpy at point 3. Subsequently, from point 3 to point 4 the high pressure gas is condensed into liquid, the refrigerant supplying the thermal energy required in heating the thermal load 38 when in the heat pump cycle mode. In the block diagram of FIG. 1 this represents passage from the mixing point following the Δp valve 42 to the input of the thermal load 38, wherein the mixture is condensed somewhat after losing superheat in the transfer of thermal energy.

To effectuate this heat pump action, the output of thermal load 38 at lower pressure (point 5 in FIG. 2) passes via the two-way valve 44 (FIG. 1) to the input of the return TXV 46, where the flow is somewhat expanded and cooled. The pressure drop at the return TXV 46 is controlled by a signal from the sensor bulb 58 that is placed in close thermal contact with the refrigerant line which exits the evaporator 50. The two-phase mixture output from the return TXV 46 is evaporated and receives some superheat within the evaporator 50 to point 6 on FIG. 2, from which it transfers, uncompressed, to point 1 to repeat the heat pump cycle. This demonstrates that thermal energy contributions at ambient temperature levels can be integrated into the thermal control system.

Limitations exist in the operation of the ambient temperature evaporator, however, because water freezing can clog the heat exchanger (HEX) especially, for example, if pure water is used for condenser cooling. Thus an antifreeze mixture will typically be used for this purpose, and the level of antifreeze used in the cooling water is adjusted to meet the temperature of concern. The return TXV 46 is also operated so as to ensure that superheat exists at the point at which sensing takes place, because, in general, compressors cannot satisfactorily operate if liquid is in their input. The return TXV 46 thus provides the maximum cooling that the compressor can provide at the lowest temperature feasible. In the heatup path 56 this translates to the maximum heating that can be provided at a heat pump since whatever is cooled has to be heated first and alternatively, whatever is evaporated must first be condensed. The path from point 4 to 5 in FIG. 2 is that through the return or heatup TXV 46. A heat pump can also be considered as a refrigerator, and conversely refrigerators can also be termed heat pumps. A household heat pump thus refrigerates the outside air and transfers that heat, along with the power supplied to the compressor, to the inside of the house. In FIG. 1 the air or water is refrigerated as it passes through the ambient temperature evaporator 50. The thermal energy absorbed in the transfer is used, supplemented by that power injected to the compressor 12, to heat up the thermal load 38.

In the heat exchange with the separate fluid (e.g. air or water) in the ambient temperature evaporator 50 the refrigerant liquid is superheated. It is desirable, of course, to avoid freezing water vapor in cooling air 110 (or solidifying alternative cooling water) in the ambient temperature evaporator 50, so a valve 62 is employed following the ambient temperature evaporator 50. This valve 62 is of the type that is sensitive to the pressure at the input to the compressor 12, and is commonly known as an "open on rise of input temperature" (ORIT) valve. The ORIT valve 62 ensures that the output flow from the evaporator 50 preceding the valve remains at a high enough pressure (and consequently high enough boiling temperature) for the heat source for the evaporator 50 to boil off the refrigerant and provide sufficient superheat without incurring any freezing within the coolant stream. As shown in FIG. 2, the refrigerant is at a temperature above 0° C. Therefore, any fluid heating said refrigerant in evaporator 50 will not be subject to freezing temperatures.

Secondary Warmer Subsystem

In some applications, there is a need to run a subsystem at a somewhat higher temperature than the main system. Thus, it may be desired to provide an auxiliary cold chamber that is set at a temperature that is colder than the environment but above the temperature of the thermal load 38. This capability is provided herein by incorporating what may be called a cold box 70 receiving a flow of cooling air directed against exterior heat exchanger fins 78. The fins 78 are in thermal exchange relation with the thermal load 38 and the air flow is impelled by a fan 74 or other circulating system. A temperature sensor 76 responsive to the cold box temperature provides a signal to enable the controller 10 to energize the fan 74 for this exchange. Thus the cold box 70 can be held at a set temperature, colder than the environment but higher than the thermal load 38 to provide an auxiliary temperature control source. For example, the cold box 70 can be maintained at above 40° F. while the frozen food container is at about 10° F.

Use of the TDSF Concept for On-Site Preparation of Frozen Comestibles (e.g. Ice Cream)

Figure 3:
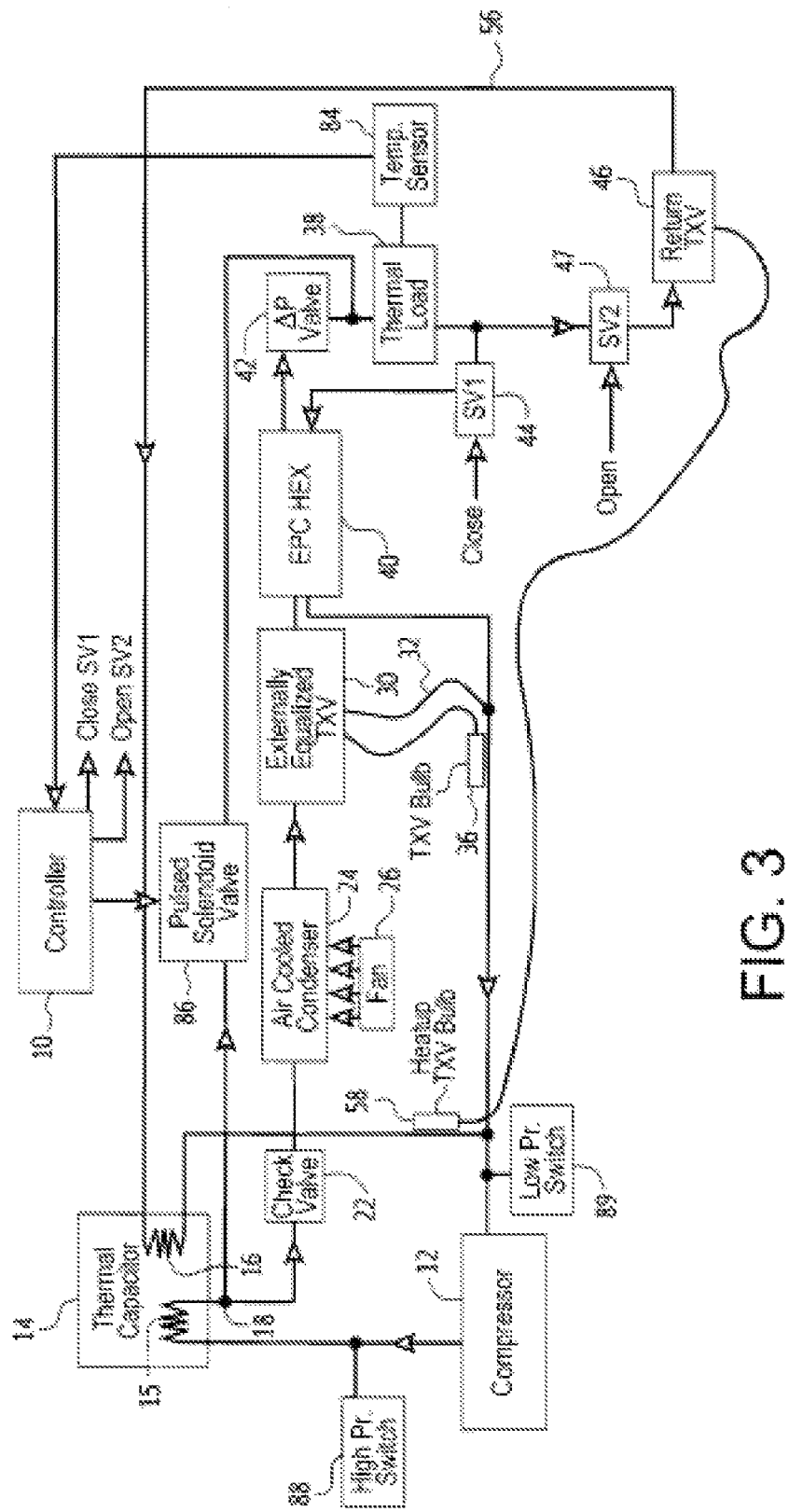
FIG. 3 is a block diagram of a system in accordance with the invention which is specifically directed to preparing frozen comestibles.
Figure 4:
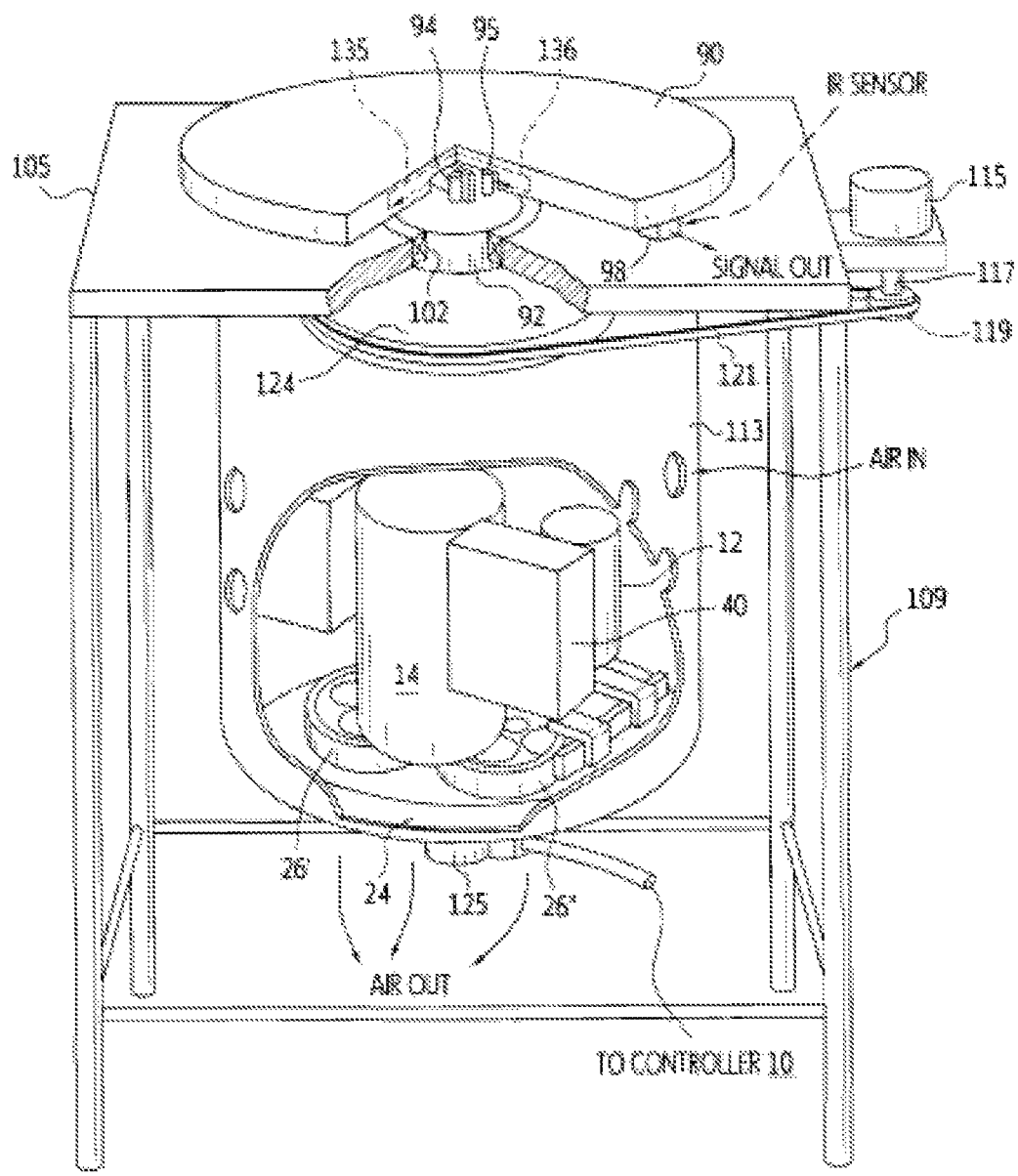
FIG. 4 is an perspective view, partially broken away, of a system for preparing comestibles in accordance with FIG. 3 showing further details thereof.
Figure 5:
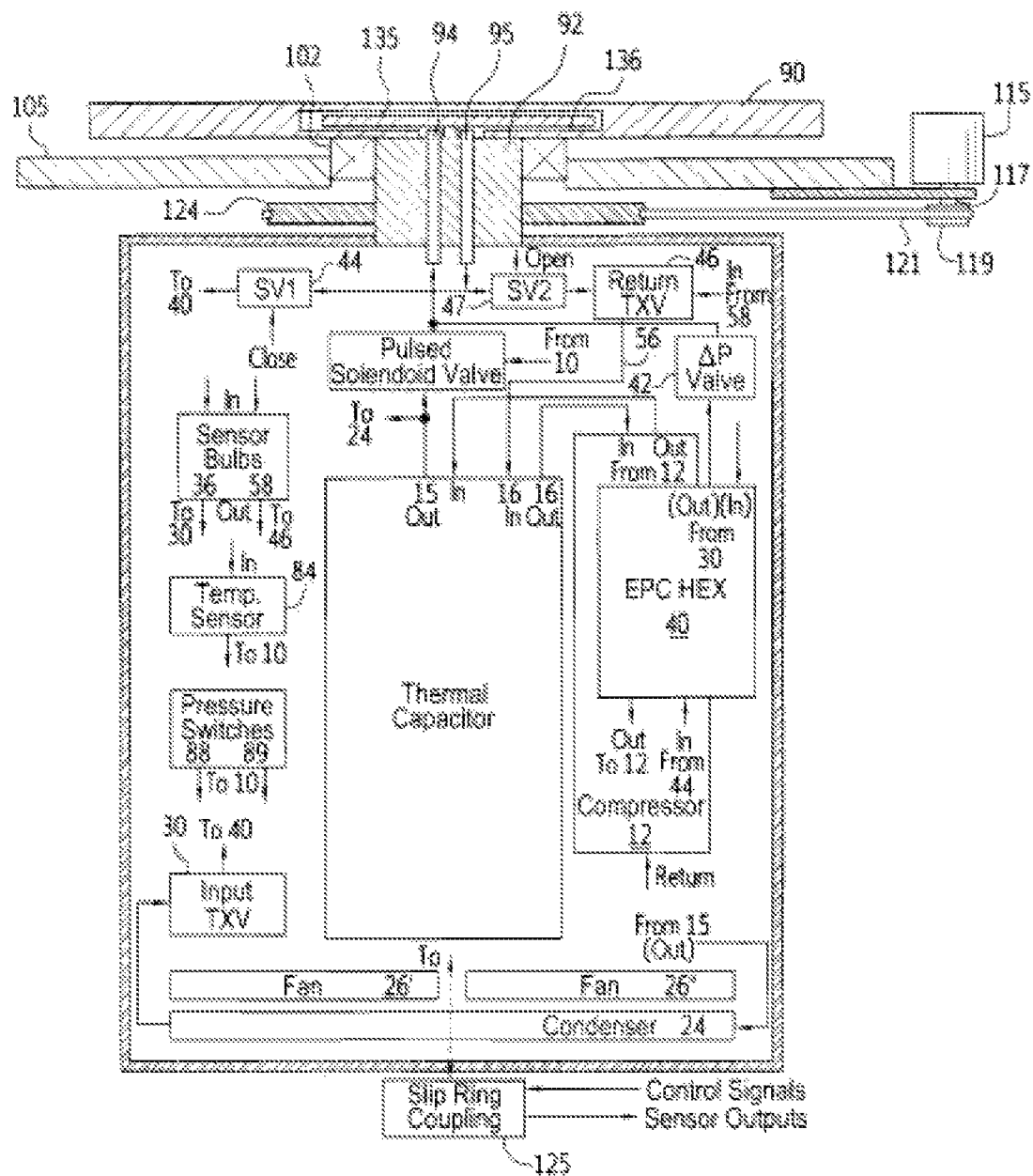
FIG. 5 is a combined side-sectional and simplified block diagram view showing the geometric distribution of principal elements of the system of FIG. 4, corresponding to elements in the block diagram of FIG. 1, that are utilized in flowing chilled refrigerant to and from the platen in operation of the system of FIGS. 3 and 4.

In a specific variant of a thermal control system in accordance with the invention, referring now to FIGS. 3-5, a refrigerant having suitable transition properties (as to temperature and pressure) between gas and liquid phases is pressurized by a compressor 12 to a hot gas at useful temperature and pressure levels, typically in the range of 80° C. to 100° C. and about 300 psi. This heated pressurized flow is directed through a thermal capacitor 14 containing a stable, chemically inert mix of liquid, typically water and glycol in equal quantities, comprising about 2000 cc in volume for this particular system. The two separate energy interchange and input-output flow paths 15 and 16 are disposed within the thermal capacitor 14, as previously described, an internal heater (not shown) being optional. The interior fluid mix is an efficient heat storage medium. The high temperature gas from the compressor 12 is typically at about 90° C., and rapidly heats the liquid mix in the thermal capacitor 14 to about this temperature. In the food application described herein, initial heatup time of thermal capacitor 14 is not critical and the liquid in the thermal capacitor 14 reaches thermal equilibrium within 20-30 minutes after starting compression. Note that, whenever feasible and appropriate, the numerical designations used in FIG. 1 are also used in FIGS. 3-5.

The output from a first exchanger 15 in the thermal capacitor 14 is divided into two paths, in accordance with the TDSF concept, with flow from the first path being directed through an air-cooled condenser 24 via a check valve 22, cooled therein by a fan 26, with the condensed output being provided to an externally equalized thermal expansion valve (TXV) 30. In the given example, an air-cooled condenser 24 is not only usually sufficient, but preferred, for cost, utility and compactness. For other applications the condenser may be cooled by liquid or other means. The condensate or combination of liquid and gas that is fed from the condenser 24 to the input of the externally equalized TXV 30 is expanded and thereby cooled, as described in the aforementioned TDSF patents. As also described in said patents, the TXV 30 is controlled by pressure from a TXV bulb 36 and the pressure signal is supplied to said TXV via an equalizing path 32, so that both are responsive to variables in the return flow that is to be input to the compressor 12 prior to said flow being injected into the compressor 12. For improving system efficiency, an EPC ("enhanced post condensing") heat exchanger 40 is disposed in position to provide thermal exchange between the output of the TXV 30 and the return flow from the thermal load 38.

The EPC heat exchanger 40 reduces the quality and enthalpy of the output from the TXV 30, which output is then transferred out through the pressure dropping (ΔP) valve 42. Output from the ΔP valve 42 is then mixed with hot gas regulated by a pulsed solenoid valve 86 and the mixture is fed to the input to the thermal load 38. The output from the thermal load 38 is returned through EPC heat exchanger 40 to the input to the compressor 12, in the principal temperature regulating mode to be described. The ΔP valve 42 assures that a temperature difference is present in the EPC heat exchanger 40 to drive the heat flow in said EPC heat exchanger. Valve 42 also assures that no flow will pass through TXV 30 whenever a full flow of hot gas is supplied to mixing tee 48. The ΔP valve 42 provides a meaningful function in the operation of the EPC heat exchanger as well as being significant to the functioning of the TDSF system.

In accordance with the present extension of the TDSF concept, hot gas from the compressor 12, here taken via the flow through the channel 15 in the thermal capacitor 14, is supplied at a controlled rate by a PDM (pulse duration modulated) solenoid valve 86 coupled to the input to the thermal load 38, after junction with said ΔP valve 42. The pulse repetition rate (typically of the order of once each few seconds) of the PDM valve 86 is established by control signals from the controller 10 which receives temperature responsive signals from a temperature sensor 84 as to the current operating temperature of the thermal load 38. In this example, the sensor 84 is preferably an infrared sensor (not shown in detail) at a suitable spacing from the thermal load 38. It provides a sufficiently accurate temperature reading, by remote sensing, for the controller 10 to modulate the pulse duration at the solenoid valve 86, and thus control the temperature of the thermal load 38.

In accordance with the invention, the thermal energy generated for system operation may also be utilized in a different functional mode to raise the thermal load 38 to a substantially higher temperature than the normal operating temperature, in what might be termed a "heatup" mode. For this purpose, a first, normally open, solenoid valve 44, (labeled SV1) is in the flow path between the thermal load 30 and the EPC heat exchanger 40 and is closed by a signal from the controller 10. A shunt path from the thermal load 38 also leads to a normally closed solenoid valve 47, (labeled SV2) which is concurrently opened for rapid heatup by the controller 10. The output from the thermal load 38 thus is directed into a rapid heatup path 56 that leads back to a separate input channel 16 within the thermal capacitor 14, via a return or heatup TXV 46. Thermal energy stored in the thermal capacitor 14 is thereby given up to the recirculating flow via the input channel 16 wherein any liquid refrigerant in said recirculating flow is boiled away, for return to the input to the compressor 12 as pure gaseous refrigerant. Consequently the thermal energy stored in the thermal capacitor 14 is useable directly instead of employing a separate heater or accumulator at the compressor 12 input. Operation of said return or heatup TXV 46 in response to signals from a heat up bulb 58 positioned along the output line from the second channel 16 of the thermal capacitor 14 ensures that the refrigerant returned to said input of compressor 12 is a pure gas. Other features developed in accordance with implementation of the TDSF concept may be employed in this system, although as shown only a high pressure switch 88 at the compressor 12 output and a low pressure switch 89 at the compressor input are included as examples of what might be incorporated to provide signals to the controller 10.

Accordingly, in operation, the system of FIG. 3 extracts, at the thermal capacitor 14, a portion of the thermal energy from the output flowing from the compressor 12, quickly (normally within 10-30 min.) stabilizing so that the inputs to the air-cooled condenser 24 and the PDM solenoid valve 86 are thereafter at a high operating temperature. As in the TDSF concept in general, the hot gas flow is modulated to bring the mixed temperature at the thermal load 38 input to a desired operating level. Here, however, the pulsed solenoid valve 86 provides a different and compact type of proportional valve and enables reliable operation with adequate precision and a considerable reduction in cost, a factor of primary importance in the retail food preparation application specifically described below. The thermal energy transfer mechanisms are described in more detail with reference to the description of the example of FIGS. 4 and 5.

The extraction of and storage of thermal energy derived from the output flow of the compressor 12 provides at least two features of general applicability to TDSF systems as well as specific benefits to the food processing example of FIGS. 4 and 5. The thermal capacitor (or heat sink) 14 provides a thermal storage capability, potentially accessible to a number of internal thermal exchangers and not just the two exchanger channels 15 and 16 depicted in FIG. 1 within the housing of the thermal capacitor 14. This can be very useful in other TDSF systems, to effectively utilize different phases and states that exist in a two-phase refrigerant in saturated state. In the example of FIGS. 3-5, however, the stored thermal energy is used for a special high temperature (servicing or cleaning) operations.

To accelerate heating of the thermal load 38 for cleaning purposes the output is taken from the interior heat exchanger channel 15 in the thermal sink/capacitor 14 when the pulsed solenoid valve 86 is fully opened, so that the heated flow goes directly into the input to the thermal load 38. The rate of temperature rise at the load 38 depends on its thermal mass as well as the refrigerant temperature, but in this example (in which the load is a 30 pound aluminum platen which is to be raised to a service temperature of about 29° C.), only a few minutes are required, at most. During this heatup process the flow from the heat exchanger 15 portion of the thermal capacitor 14 is conducted through said thermal load 38 in process of heating. After the thermal load 38, the output flow, in this rapid heating mode, passes through the normally closed solenoid valve (SV2) 47, opened by command of the controller 10. During normal operation, exclusive of the rapid heatup or service mode operation, flow exiting thermal load 38 passes through normally open SV1 valve 44, then the EPC HEX 40 and back to the compressor 12 input. The service mode, using temporary heating, can be conducted for an arbitrary length of time or until load 38 reaches a variable or specifically selected temperature.

To meet the requirements of the second mentioned mode (control of compressor input) various techniques for this specific purpose, including the use of separate heaters and/or accumulators, have previously been employed. Here, however, the creation of separate recirculation paths from the thermal load 38 into the thermal capacitor 14 via the internal exchanger element 16 and then to the compressor 12 input enable improved control at low cost with no requirements for additional power. Heating power is derived from the compressor heat generated in the process of cooling during standard operation. For this function, the output from the thermal load 38 is directed by controller 10 through a normally closed solenoid valve 47 (SV2) to the separate heat exchanger channel 16 disposed in heat exchange relation within the liquid thermal sink in the thermal capacitor 14. Valve 47 is controlled to be open and normally open valve 44 (SV1) is closed for this mode. Within heat exchanger channel 16 any liquid condensed in heating the thermal load 38 is evaporated. Thereafter the heated gaseous fluid is returned to the compressor 12 input. However, this flow is controlled proximate the output of the thermal load 38, where the heatup TXV 46 is positioned in the flow path, and is responsive to the superheat temperature at the second heat exchanger channel 16 in the thermal capacitor 14, which temperature is sensed by a heatup TXV bulb 58 along the return path to the compressor 12 input. For this particular application involving fast chilling of the food portions the thermal capacitor comprises a tank of only about 2000 cc in volume. Clearly, however, a thermal sink of substantially different volume can be used, as dictated by the demands of a particular application.

Whereas a substantial number of temperature control systems using the TDSF concept have been directed toward high value process functions, such as the deposition of high density miniaturized semiconductor circuit patterns, the TDSF concept, as disclosed herein, is also amenable to usage in totally different economic and commercial applications. One such application is more specifically shown in FIGS. 4 to 5, corresponding to the system arrangement of FIG. 3. These Figures depict details of the geometry of an exceptionally compact, low cost system containing the operative elements of FIG. 3 as adapted for providing individually customized food products that are processed at freezing or other low temperatures. In FIGS. 4 and 5, the thermal load in the system comprises an externally accessible rotatable food processing platen 90, which is thermally conductive and here positioned to present an uppermost working surface. In this example the platen 90 is of solid aluminum, and approximately 1 "thickness and 19" in diameter. Thus it provides a mass which is not only highly thermally conductive but physically rugged capable of withstanding constant use. The upper surface of the platen 90, which here weighs about 30 lbs., is flat, and the platen is rotatable in a horizontal plane about its central vertical axis, so that the upper surface can receive a serving of a food mix for rapid freezing. In this instance the comestible is an individually variable mix of an ice cream of chosen flavor, typically from 3 to 8 oz, in quantity, although the size of the portion can be varied widely. The platen 90 is mounted on and rotatably driven by a centrally mounted hub 92 through which are extended a pair of refrigerant tubes comprising separate outlet and return tubes 94, 95, which extend up to communicate as inputs and outputs with interior heat transfer passageways 135, 136 (FIG. 5 particularly) distributed laterally within platen 90, through conventional encompassing seals (not shown in detail) as needed, to prevent refrigerant leakage. The heat transfer passageways 135 and 136 serve to distribute thermal energy from the incoming mix throughout the volume of the heat conductive platen 90 so as to minimize temperature differences between the cooled load on the platen 90 and the two phase refrigerant within the passages. An infrared sensor 98 (FIG. 4 only) positioned proximate the underside of the platen 90 periphery, provides temperature signals to the controller, such as the unit 10 of FIG. 1.

The hub 92, through which the outlet and return tubes 94, 95 extend vertically rotates with the platen 90 about a vertical axis, within a ball bearing ring 102 encircling the hub 92. The ball bearing ring 102 rotatably couples the rotating hub 92 and the platen 90 above it to an intermediate, horizontal stationary support plate 105 which receives ball bearing ring 102 within a central orifice 106 concentric about the central axis. Thus the support plate 105 provides a horizontal physical base for a number of rotating parts both above it and below it within the system. Support plate 105 is positioned vertically well above and supported on a lower, stationary base frame 109. The base frame 109 supports the rotating central hub 94, the rotating uppermost platen 90, and, below the stationary surface plate 105, a relatively small volume rotating housing 113 containing the operative parts of the temperature control system as seen in the block diagram version of FIG. 3.

The upper stationary support plate 105 provides a base for a vertically extending small drive motor 115 mounted along an edge of the outside the periphery of the housing 113. The shaft 117 of drive motor 115, which extends down, rotates about a vertical axis, the motor body being supported by a lateral extension of the support plate 105. Proximate the underside of the support plate 105, the motor shaft 117, extending down, turns a radially extending driver pulley 119 engaged to a peripheral drive belt 121. The belt 121 also extends around and drives a larger driven pulley 124 coupled to the periphery of the hub 92, so that rotational torque from drive motor 115 turns the entire rotatable assembly including the platen 90, the hub 92 and housing 113 about a central vertical axis. Electrical power is supplied by a conventional electric line (not shown in FIGS. 4 and 5) to the drive motor 115. Electrical power is also supplied to those operative components within housing 113 via an electrical slip ring 125, shown generally only, on the underside of housing 113, along its central axis. Thus, as motor 115 turns the rotatable assembly, principally platen 90, hub 92 and housing 113, electrical signals and power are also supplied via the slip ring 125 from electrical lines 131 to the interior elements of the thermal control system which are within housing 113. The housing 113 rotates within the base frame 109, supported by the low friction ball bearing ring 102. The controller 10 and the temperature sensor 84 are exterior to housing 113 and depicted only in generalized form in FIGS. 1, 3 and 4.

The rotating assembly includes most of the operative elements shown in FIG. 3, but in a suitably dense and compact configuration, only some principal elements of which are depicted generally in FIG. 5 to show the flow paths, because the functional arrangement is adequately disclosed in the block diagram of FIG. 3. In FIG. 5 an array of fans 26', 26", etc., each rotatable about a vertical axis is disposed laterally above an immediately underlying condenser 24 at the bottom of the rotatable housing 113. The path to the fans 26', 26", etc. for cooling air flow for the condenser 24 can be derived through sidewall apertures 127 (shown diagrammatically only) in the housing 113. The compressor 12 occupies a substantial part of the interior volume of the housing 113, and the substantial majority of active elements are also contained within the interior volume. Specific flow connections from the compressor 12 to the small tank comprising the thermal capacitor 14 within FIGS. 4 and 5 have not been depicted since these are arbitrarily selectable by those skilled in the art. Also, neither the various flow paths nor the interconnections to the internal elements used in the TDSF concept, are shown and described specifically in FIGS. 4 and 5. These include the solenoid valves 44, 47 and 86, and the TXVs 30 and 46 depicted in FIG. 1, all of which are described in detail with respect to the diagrams of FIGS. 1 and 3. All the components of the system apart from the controller and infrared temperature sensor, however, are encompassed without undue compaction within the relatively small volume of the housing 113, which in one specific example is only approximately 12" in diameter.

This "spinning TDSF" concept, as shown in FIGS. 4-5, provides a particularly advantageous and novel approach to the preparation of a food product, and to other temperature control applications as well. With the independently modulated flow of hot gas and expanded cooled refrigerant mixed with it, in accordance with the TDSF concept, and with a thermally conductive platen of substantial mass, a small, relatively low power input can be enclosed in a small housing while also deriving the benefits of using this modified TDSF approach.

Novel and advantageous features in accordance with the invention also include combinations of structures and functions by which the spaced apart controller can respond to temperature within the spinning assembly with control signals delivered through a dynamic connection such as a slip ring into the otherwise self-contained temperature control system. The pulsed solenoid valve which is the principal effective means of temperature control in this operatively integrated closed loop system is of particular benefit in achieving goals of low cost and reliability together with compactness.

In more general terms, however, systems and methods as shown in the Figures and described in the specification provide highly versatile and widely adaptable temperature control systems using direct transfer of saturated fluids for transfer of thermal energy. They provide a variety of hitherto unavailable ways of storing and employing thermal energy in dual phase state, and with high efficiency and selectable levels of temperature resolution. Specifically, a variety of temperature control systems based on the use of a two-phase medium are disclosed, including versatile options for pulse modulation control of load temperature, alternative or combinational control of temperature using input and/or output control and as well an optional ambient temperature evaporator mode which is of general applicability.

What is claimed is:

1. A system for preparing individual custom servings of a thermally congealed food product comprising:
    a thermally conductive platen having an upper planar surface on which the starting ingredients for fluid refrigeration can be disposed;
    a drive system for rotating the thermally conductive platen about a central vertical axis;
    a pair of refrigerant tubes rotatable with the thermally conductive platen and having upper termini in thermal interchange relationship to the inferior side of the thermally conductive platen, and lower termini extending downwardly therefrom;
    a refrigeration system coupled to the lower termini of the pair of refrigerant tubes, the refrigeration system further including a compressor coupled to cycle refrigerant between the pair of refrigerant tubes, and also including, along the central vertical axis, a condenser and an adjacent air blower unit;
    a housing rotatable with the thermally conductive platen and incorporating the pair of refrigerant tubes of the refrigeration system, the housing including side orifices for allowing cooling airflow therein; and
    the system further including a controller responsive to the temperature of the thermally conductive platen to vary the temperature of the refrigerant to maintain the thermally conductive platen temperature in a selected temperature range.

2. The system as set forth in claim 1 above, wherein the thermally congealed food product is of a class of products comprising ice creams, sherbets and gelatos, and wherein the system further comprises;
    the thermally conductive platen disposed at uppermost of the central vertical axis and having a superior surface for receiving the thermally congealed food product to be thermally congealed and interior passageways for conveying the refrigerant;
    the drive system includes a stationary platform below and parallel to the thermally conductive platen and including a drive motor supported on a plate and a belt and pulley system depending from the plate and rotating the thermally conductive platen and housing at a chosen range of revolutions per minute; and wherein the controller maintains the thermally conductive platen temperature in a range.

3. The system as set forth in claim 2 above, wherein the drive system includes a motor mounting vertically from the stationary platform outside the housing periphery, and the housing comprises a cylindrical body of less than 15" diameter concentric with the central vertical axis.

4. A system for congealing by cooling a food product on a refrigeration system, comprising:
   a heat conductive element having an upper surface for receiving ingredients to be cooled;
   a drive system for rotating the heat conductive element about a central vertical axis normal to a plane thereof;
   a refrigeration system disposed beneath the heat conductive element and rotatable therewith for flowing cooled refrigerant in thermal contact with the underside of the heat conductive element; and
   the drive system engaging both the heat conductive element and the refrigeration system for rotating the heat conductive element and the refrigeration system concurrently.

5. The system as set forth in claim 4 above, wherein the heat conductive element comprises a heat conductive platen having a planar upper surface;
   and wherein the refrigeration system comprises a frame including a compressor and refrigeration flow circuits disposed adjacent and beneath the central region of the heat conductive element.

6. The system as set forth in claim 5, wherein the refrigeration system comprises the compressor, condenser, and a thermal storage device containing a liquid mixture, and wherein the drive system comprises a central drive pulley in engagement with the heat conductive platen in a central region of the system, a drive motor mounted in stationary position exterior to the heat conductive platen, and a drive belt coupling the drive motor to the drive pulley.

* * * * *